(12) United States Patent
Takagi et al.

(10) Patent No.: US 7,844,990 B2
(45) Date of Patent: Nov. 30, 2010

(54) BROADCAST PROGRAM RECORDER

(75) Inventors: Toshihiro Takagi, Osaka (JP); Tatsuo Miyagawa, Osaka (JP)

(73) Assignee: Funai Electric Co., Ltd, Osaka (JP)

( * ) Notice: Subject to any disclaimer, the term of this patent is extended or adjusted under 35 U.S.C. 154(b) by 1571 days.

(21) Appl. No.: 10/458,935

(22) Filed: Jun. 11, 2003

(65) Prior Publication Data
US 2003/0233657 A1    Dec. 18, 2003

(30) Foreign Application Priority Data
Jun. 13, 2002    (JP) ............ 2002-003581 U

(51) Int. Cl.
G06F 3/00    (2006.01)
G06F 13/00    (2006.01)
H04N 5/445    (2006.01)

(52) U.S. Cl. ................ 725/58; 386/92; 386/124
(58) Field of Classification Search ............ 725/58; 386/92, 124
See application file for complete search history.

(56) References Cited

U.S. PATENT DOCUMENTS

| | | | |
|---|---|---|---|
| 6,311,011 B1 * | 10/2001 | Kuroda | 386/46 |
| 6,324,338 B1 * | 11/2001 | Wood et al. | 386/83 |
| 6,344,878 B1 * | 2/2002 | Emura | 348/460 |
| 6,370,317 B2 * | 4/2002 | Nagano et al. | 386/83 |
| 6,557,171 B1 * | 4/2003 | Sonoda et al. | 725/136 |
| 7,003,213 B1 * | 2/2006 | Hasegawa | 386/83 |
| 7,218,839 B2 * | 5/2007 | Plourde et al. | 386/83 |
| 2002/0032910 A1 * | 3/2002 | Hayasaka et al. | 725/115 |
| 2002/0049972 A1 * | 4/2002 | Kimoto | 725/39 |
| 2003/0093806 A1 * | 5/2003 | Dureau et al. | 725/107 |
| 2006/0064716 A1 * | 3/2006 | Sull et al. | 725/37 |
| 2009/0310937 A1 * | 12/2009 | Ellis et al. | 386/83 |

OTHER PUBLICATIONS

Patent Abstracts of Japan, Publication No. 11-136755, May 21, 1999, 1 pg.
Japanese Unexamined Patent Publication No. 11-136755 dated May 21, 1999, 8 pgs.
Patent Abstracts of Japan, Publication No. 11-311686, Nov. 9, 1999, 1 pg.
Japanese Unexamined Patent Publication No. 11-311686 dated Nov. 9, 1999, 7 pgs.
Patent Abstracts of Japan, Publication No. 2000-075070, Mar. 14, 2000, 1 pg.
Japanese Unexamined Patent Publication No. 2000-75070 dated Mar. 14, 2000, 5 pgs.
Patent Abstracts of Japan, Publication No. 2001-216048, Aug. 10, 2001, 1 pg.
Japanese Unexamined Patent Publication No. 2001-216048 dated Aug. 10, 2001, 15 pgs.

* cited by examiner

*Primary Examiner*—Brian T Pendleton
*Assistant Examiner*—Nnenna N Ekpo
(74) *Attorney, Agent, or Firm*—Osha • Liang LLP

(57) ABSTRACT

An information including all program names from a recording start time to a recording end time of a broadcast signal, the recording start time and the recording end time is extracted from an electronic program guide information in a broadcast signal, based on a recording information associated with the broadcast signal recorded in a recording section. An OSD image generating section generates an image of the information for all the programs extracted and outputs the image to a monitor unit 4.

6 Claims, 4 Drawing Sheets

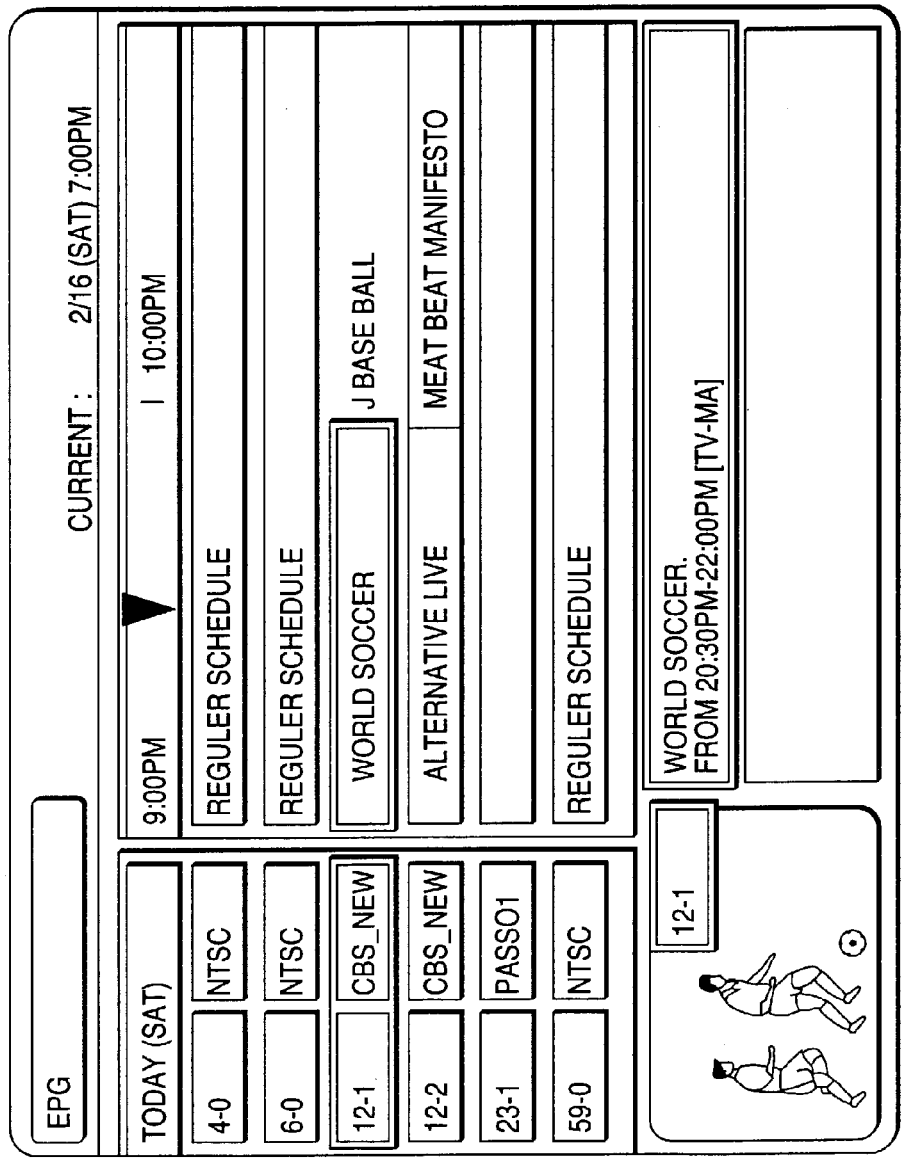

BROADCAST PROGRAM RECORDER

BACKGROUND OF THE INVENTION

1. Field of the Invention

The present invention relates to a broadcast program recorder for receiving and recording a broadcast signal transmitted along with an electronic program guide information in a terrestrial digital broadcasting.

2. Description of the Related Art

Conventionally, a broadcast program recorder such as a video recorder or a hard disk recorder with a television tuner is equipped with a clock, and has a function of automatically recording a program, when a channel of a broadcasting station to be recorded, a recording start time and a recording end time are set up. However, since the video recorder or the hard disk recorder operates with reference to a time of an onboard clock, if the time of the onboard clock is not keeping the correct time, the program may not be correctly reproduced or recorded.

Thus, various techniques for correcting the time of the onboard clock in the recorder have been proposed. For example, in JP-A-11-136755, a time correction method and a portable telephone terminal unit for use with the method is disclosed. With the technique, an equation of time information from a standard time in a service area at a base station is stored corresponding to an identification number of the base station, a report information from the base station is received, and the equation of time information corresponding to the identification number contained in the report information is read out. The equation of time information is compared with the equation of time information at previous time of correction, and the time is corrected by adding or subtracting a difference to or from the previously corrected time.

Also, in JP-A-11-311686, a computer time/date adjusting device and a method thereof is disclosed. Moreover, in JP-A-2000-075070, a time output device and a time correction method is disclosed. In addition, in JP-A-2001-216048, an information processing device, a method thereof and a program storage medium is disclosed.

In this manner, the techniques as disclosed in the above patents are applied to a broadcast program recorder including an onboard clock to easily make the time correction.

On the other hand, in a terrestrial digital broadcasting (ATSC system) that has been lately started in the North America, a broadcasting signal is transmitted with the present date and time information. Therefore, in a digital broadcast program recorder with a digital broadcasting tuner of ATSC, the present time information is acquired along with a broadcast signal, and the time of the onboard clock is corrected, based on the time information of the broadcast signal.

The present time information is recorded in a format called a GPS Second and UTC (Universal Time of Coordinated, Greenwich Mean Time), and the program start time information is also recorded. Also, the difference information of the GPS Second and UTC is included in the broadcast signal, in which the program length information (length of program) is specified in seconds from the start time.

In the terrestrial digital broadcasting of ATSC, the GPS Second holds, as a system time, the temporal information that is the elapsed time in a unit of second from AM 0:00 on Jan. 6, 1980. And the system time is converted into the UTC, and the normal date/time display is made by reflecting an equation of time that is different depending on the district.

In the terrestrial digital broadcasting of ATSC, an EPG (Electronic Program Guide) is superposed on a broadcast signal to be transmitted. The digital broadcast program recorder allows a program reservation to be made very easily, employing the EPG.

In this manner, with the conventional broadcast program recorder, if the time of the onboard clock is corrected, and a desired program is recorded by reservation, the program can be securely recorded from the start to the end. Also, when a plurality of programs broadcasted in series from the same broadcasting station are desired to record, all the programs can be securely recorded by reserving and setting the time zone where these programs are broadcasted.

However, with the conventional broadcast program recorder, one could confirm the information of channel, date and time recorded in viewing the recorded program, but there was a problem that when recording a plurality of programs from the same broadcasting station successively, one could not confirm the information for all the programs. That is, though the channel, date and time zone in which a plurality of programs were recorded successively could be confirmed, the name and the recording time zone for each program could not be confirmed. This also occurs with the case of a terrestrial broadcast program recorder in which the information of each program could be acquired with the EPG. Therefore, in some cases, the user for the broadcast program recorder cannot confirm what was recorded before reproducing the recorded program.

SUMMARY OF THE INVENTION

It is therefore an object of the invention to provide a broadcast program recorder that enables information of each program to be confirmed even when a plurality of programs are recorded successively.

In order to achieve the object, a broadcast program recorder according to a first aspect of the invention has the following structure.

(1) A broadcast program recorder includes: a receiving section adapted to receive a broadcast signal on a selected channel from a broadcast signal transmitted along with an electronic program guide information including a program information corresponding to a program broadcasted by the broadcast signal; a data recording section adapted to record and manage the broadcast signal of the selected channel from a recording start time to a recording end time as one file; a file information recording section adapted to record a recording information including a channel of the broadcast signal recorded in the file, the recording start time and the recording end time, associated with the file recorded in the data recording section; a control section adapted to extract all the program names included in the file from the electronic program guide information within the file, based on the recording information recorded in the file information recording section; and an image output section adapted to output an image signal to display at least a part of all the program names included in the file.

According to the above configuration, the control section extracts all the program names included in the file from the electronic program guide information within the file, based on the recording information recorded in the file information recording section, and the image output section outputs an image signal to display at least part of all the program names included in the file. Accordingly, the digital broadcast program recorder allows the user to confirm the name of each program on the image display device for displaying the image signal, even when a plurality of programs are recorded in series.

(2) The control section may extract the broadcasting start time and the broadcasting end time for each program, in addition to all program names.

In the above configuration, the broadcasting start time and the broadcasting end time are extracted, in addition to all the program names. Accordingly, the content of each program included in the file recorded with the minimum amount of information can be grasped by the temporal information.

(3) The control section may convert the broadcasting start time and the broadcasting end time for each program into a relative time with reference to the recording start time, and the image output section may output an image signal to display the relative time for each program.

In the above configuration, the broadcasting start time and the broadcasting end time for each program are extracted and converted into the relative time with reference to the recording start time, and an image signal displaying the relative time for each program is output. Accordingly, the user can easily grasp the recording time length for each program by displaying the relative time from the recording start on the image display device that displays the image signal.

(4) The control section may extract the electronic program guide information corresponding to the recording information from the electronic program guide information in the broadcast signal, and the image output section may output an image signal to display the electronic program guide information extracted by the control section.

In the above configuration, the electronic program guide information corresponding to the recording information is extracted from the electronic program guide information in the broadcast signal, and the image signal is output. Accordingly, the user, who wants to know the details of program information, can easily confirm the information of each program on the image display device that displays the image signal.

BRIEF DESCRIPTION OF THE DRAWINGS

The above objects and advantages of the present invention will become more apparent by describing preferred exemplary embodiment thereof in detail with reference to the accompanying drawings, wherein:

FIG. 2 is a display example of an EPG (Electronic Program Guide) that is displayed on a monitor unit;

DETAILED DESCRIPTION OF THE PREFERRED EMBODIMENTS

Referring now to the accompanying drawings, a description will be given in detail of a preferred embodiment of the invention.

Figure 1:
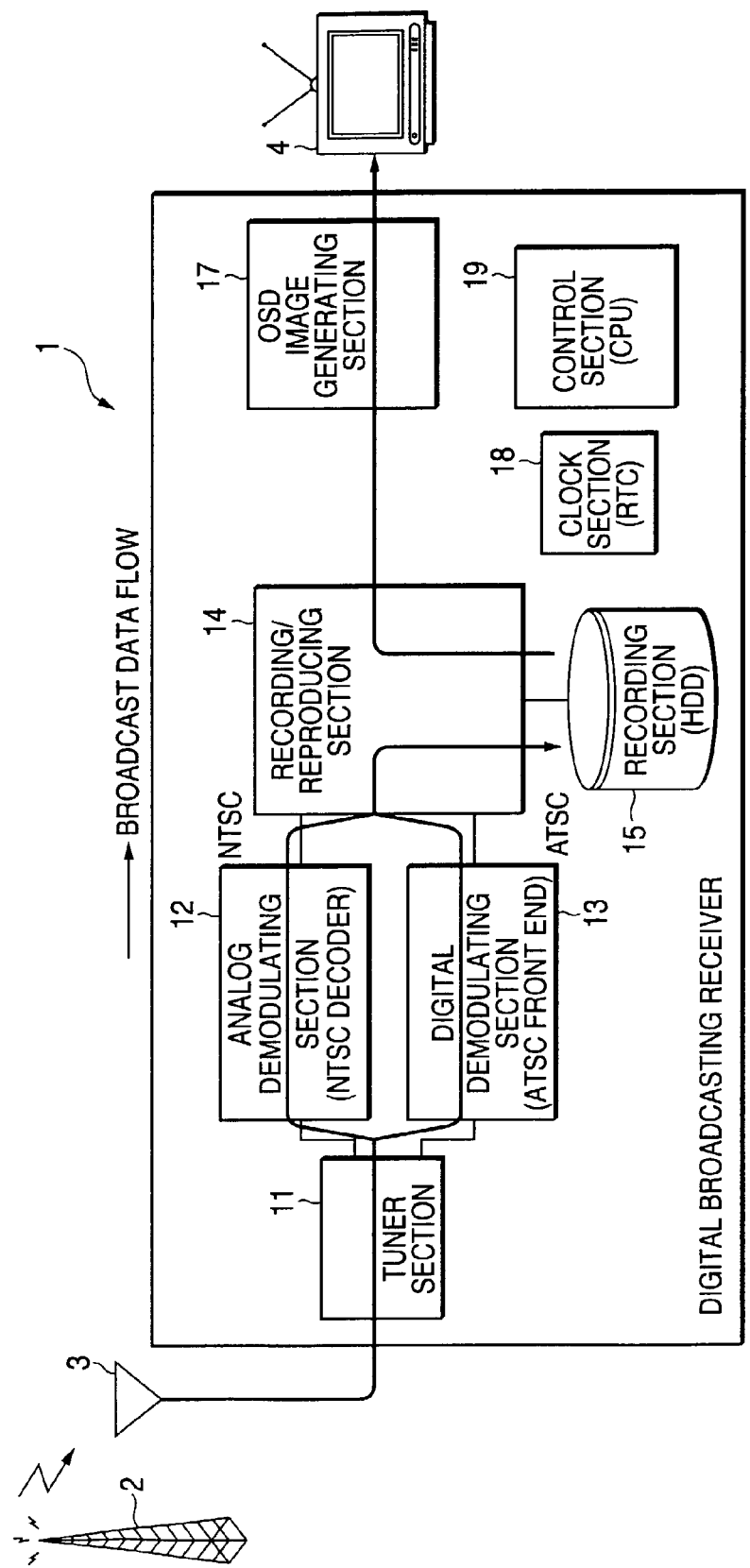
FIG. 1 is a block diagram showing a diagrammatic configuration of a digital broadcast program recorder according to an embodiment of the present invention.

A digital broadcast program recorder that receives and records a terrestrial digital broadcasting in which a broadcast signal with an EPG superposed is transmitted will be described below by way of example. FIG. 1 is a block diagram showing a diagrammatic configuration of the digital broadcast program recorder according to an embodiment of the present invention. The digital broadcast program recorder 1 receives at an antenna 3 a radio wave radiated from a radio tower 2 in a broadcasting station and outputs a broadcast signal to a monitor unit 4, which provided as a display section. In the embodiment, the digital broadcast program recorder 1 as shown in FIG. 1 is configured to receive not only the terrestrial digital broadcasting (a broadcasting of ATSC system) but also the conventional terrestrial analog broadcasting (a broadcasting such of NTSC system), but may receive the terrestrial digital broadcasting alone.

The digital broadcast program recorder 1 includes a tuner section 11, an analog demodulating section (NTSC decoder) 12, a digital demodulating section (ATSC front end) 13, a recording/reproducing section 14, a recording section (HDD) 15, an OSD (On Screen Display) image generating section 17, a clock section (RTC) 18 and a control section (CPU) 19.

A broadcast signal of program output from a plurality of broadcasting stations, not shown, is radiated as a radio wave (broadcast signal) having a different frequency from the ratio tower 2. The tuner section 11 converts a radio wave radiated from the radio tower 2 and received at the antenna 3 into an electric signal. The tuner section 11 also outputs the signal to the analog demodulating section 12, when the received radio wave is in NTSC format, or outputs the signal to the digital demodulating section 13 when the received radio wave is in ATSC format. The analog demodulating section 12 decodes the broadcast signal of NTSC and outputs it to the recording/reproducing section 14. The digital demodulating section 13 decodes the broadcast signal of ATSC and outputs it to the recording/reproducing section 14. The recording/reproducing section 14 encodes the broadcast signal output from the analog demodulating section 12 or the digital demodulating section 13 into data of MPEG format. The data is output to the recording section 15 for recording the broadcast signal. The recording/reproducing section 14 also reads and decodes the data of MPEG format recorded in the recording section 15, and outputs the decoded broadcast signal to the OSD image generating section 17. Moreover, the recording/reproducing section 14 reads the EPG data from the recording section 15 upon an instruction of EPG display from an operation section, not shown, and outputs the EPG data to the OSD image generating section 17.

The recording section 15 records and manages one or more files in a data area, where one file is supposed to contain data from a recording start to a recording end of the broadcast signal on any channel. Also, the recording section 15 records and manages a title in an index area, in which the title has the recording information including the channel, the recording start time and the recording end time for the broadcast signal recorded in this file, associated with the file recorded in the data area.

The OSD image generating section 17 generates an image data, synthesizes the image data on a video of broadcast signal, and outputs synthesized data to the monitor unit 4. For example, the OSD image generating section 17 acquires the time information from the clock section 18, generates an image data with time information, synthesize the image data on the video data, and outputs the video data to the monitor unit 4. When a broadcast signal output from the video recording/reproducing section 14 contains the EPG data, the image data is generated by reading out the EPG data and output to the monitor unit 4. Moreover, in generating the image data for the EPG data, the time information is acquired from the clock section 18 to generate the image data with time information, which is synthesized on the video data and output to the monitor unit 4.

The clock section 18 is an onboard clock to indicate the current time. The control section 19 controls each section of the digital broadcast program recorder 1.

A display example of the EPG that the digital broadcast program recorder 1 with the above configuration outputs to the monitor unit 4 will be now described. FIG. 2 is a display example of the EPG (Electronic Program Guide) that is displayed on the monitor unit, in which the programs from 8:30 PM to 11:00 PM for six broadcasting stations are represented. In the embodiment, the EPG has a display method for displaying a program broadcasting schedule for all the broadcasting stations such as a program table of the news paper as the display data, and a display method for displaying a program broadcasting schedule for all the broadcasting stations by receiving a program broadcasting schedule for each broadcasting station. A specific example of the EPG as shown in FIG. 2 is the latter case.

In the program columns on channels 4-0, 6-0 and 59-0 for the broadcasting station of NTSC, details of the program broadcasting schedule are not listed, because the broadcast signal of NTSC contains no EPG information. In the program columns on the channels 12-1 and 12-2 for the broadcasting station of ATSC, the details of the program broadcasting schedule are displayed, because the EPG data is transmitted. Referring to the EPG, the user can confirm that "World Soccer" is scheduled from 8:30 PM to 10:00 PM and "J BASEBALL" is scheduled from 10:00 PM to 11:00 PM on channel 12-1. Also, the user makes the recording reservation for a desired program by confirming the EPG displayed on the monitor unit 4.

An example where a plurality of programs in series are recorded by the digital broadcast program recorder of this invention will be described below. FIG. 3 is a display example of the recorded content of the digital broadcast program recorder that is displayed on the monitor unit 4. FIG. 4 is a flowchart for explaining the operation of the digital broadcast program recorder. In the following example, the digital broadcast program recorder 1 has a broadcast signal for "World Soccer" broadcast from 8:30 PM to 10:00 PM and "J BASEBALL" broadcast from 10:00 PM to 11:00 PM on channel 12-1, which are displayed in the EPG as shown in FIG. 2, the broadcast signal being associated with a TITLE 1 and recorded in the recording section 15.

The digital broadcast program recorder 1 operates in the following manner, when the user confirms the program recorded in the recording section 15. First of all, when the user operates the operation section, not shown, to display the title recorded in the recording section 15 of the digital broadcast program recorder 1 on the monitor unit 4, the control section 19 detects the operation (S1). The control section 19 reads out the information of each title recorded in the recording section 15, and outputs it to the OSD image generating section 17. The OSD image generating section 17 generates an image so that a list of titles recorded in the recording section 16 is displayed in a title display column 22 of a display screen 21a as shown in FIG. 3A, and outputs the image to the monitor unit 4.

Figure 3A:
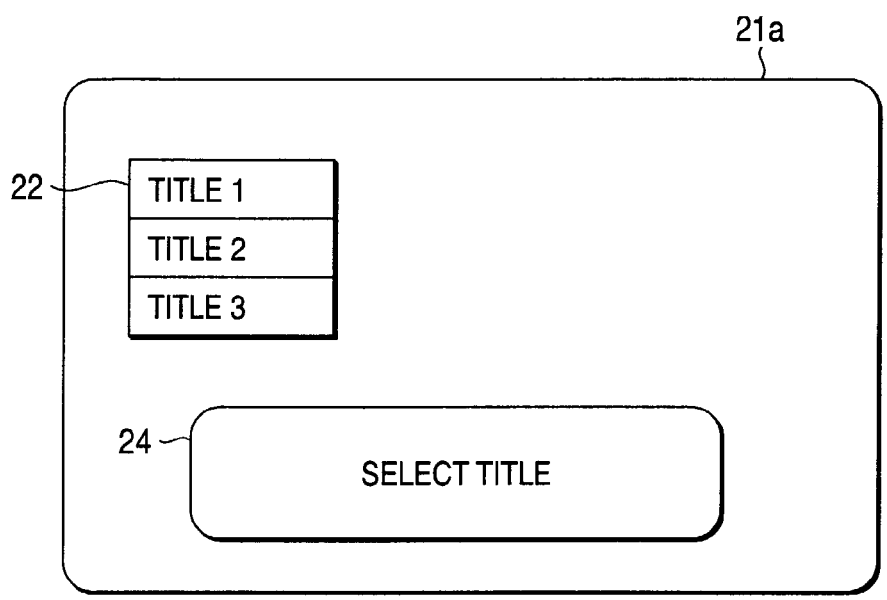
FIG. 3 is a display example of a recorded content of the digital broadcast program recorder that is displayed on the monitor unit.
Figure 4:
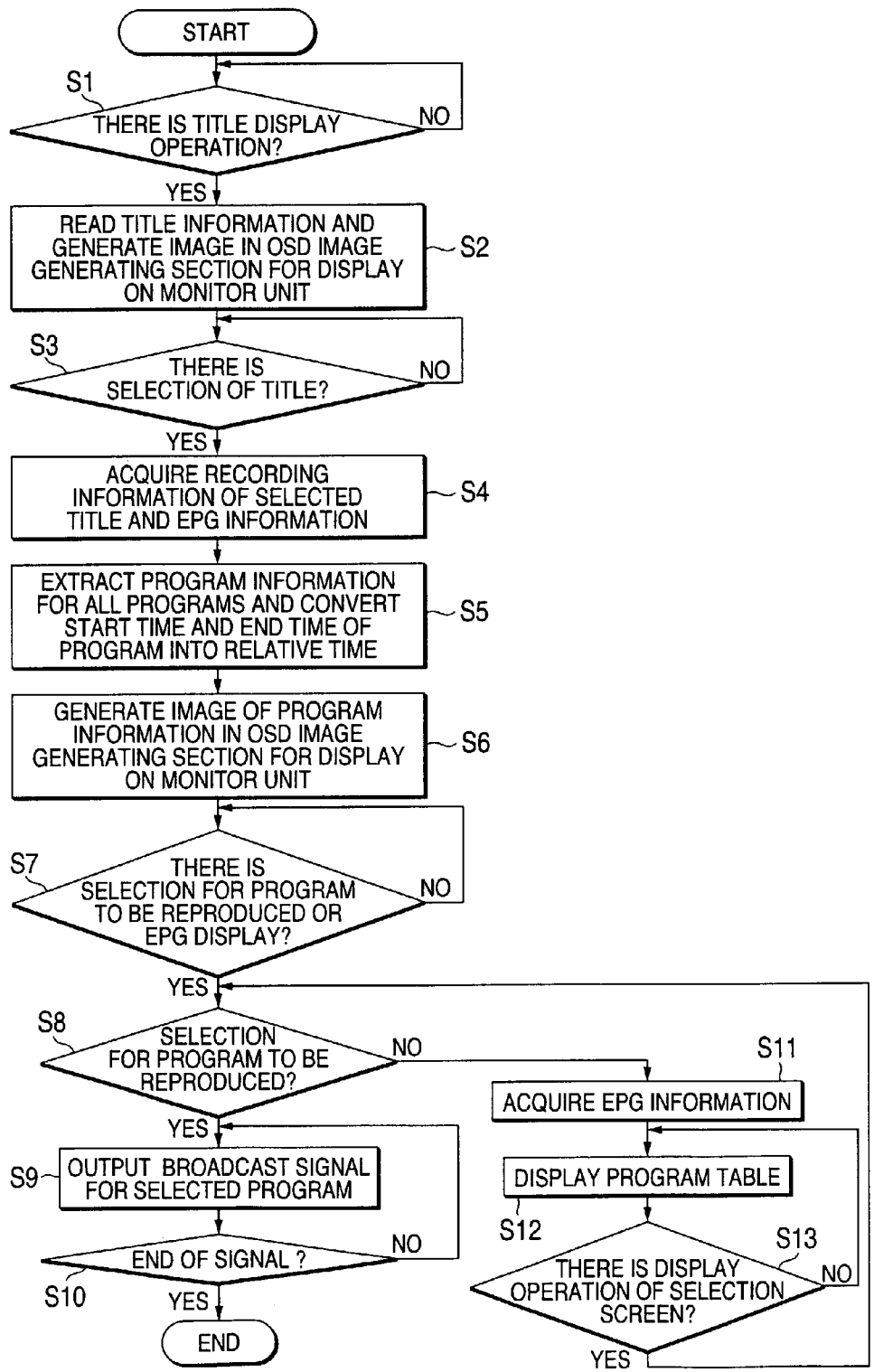
FIG. 4 is a flowchart for explaining the operation of the digital broadcast program recorder, in which a process from the program receiving reservation to the program receiving completion for the digital broadcast program recorder is shown.

The monitor unit 4 displays the image as shown in FIG. 3A, based on the image data output from the OSD image generating section 17 (S2). In the example of FIG. 3A, the title display column 22 and a message display column 24 are displayed on the screen 21a. Three titles recorded in the recording section 15 are displayed in the title display column 22, in which each title has the channel name and the recorded date and time information (recording start time and recording end time) as the recording information, not shown. A message for prompting selection of the title is also displayed in the message display column 24.

Figure 3B:
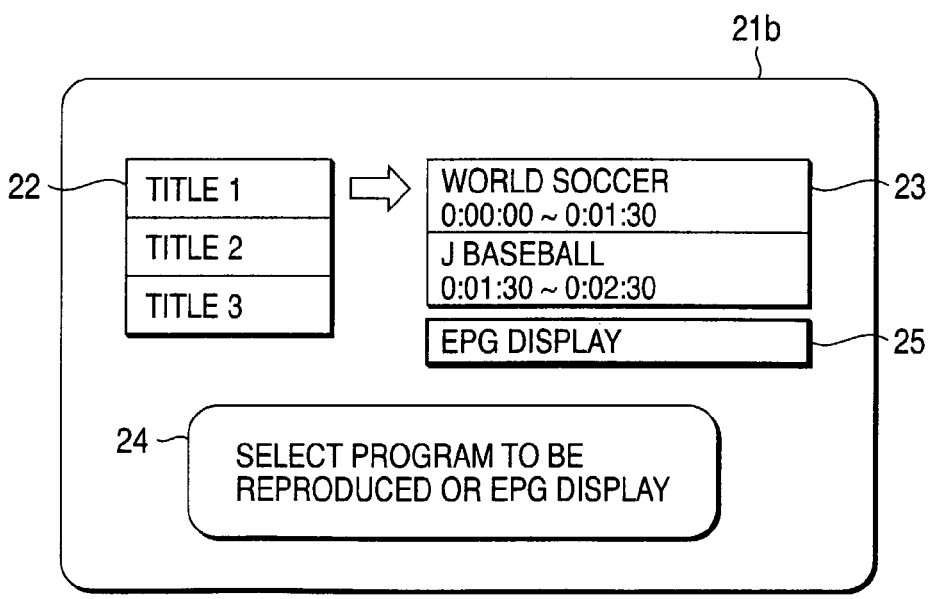

The user operates the operation section, not shown, to select any title. When the control section 19 detects that one of the title is selected by the user (S3), the control section 19 acquires the channel name and the recorded data and time information as the recording information for the selected title. The control section 19 reads a section of the recording signal for the selected title to acquire the EPG information (S4). The control section 19 extracts the program information of all the programs from the start to end time of recording for the selected title from this EPG information. For example, the control section 19 extracts the name of each program and the broadcasting start time and the broadcasting end time as the program information. And the control section 19 extracts the program information and converts the broadcasting start time and the broadcasting end time of the extracted program into the relative time with reference to the recording start time of the TITLE 1 (S5). In the example of FIG. 3B, TITLE 1 is selected, and "World Soccer" broadcast from 8:30 PM to 10:00 PM and "J BASEBALL" broadcast from 10:00 PM to 11:00 PM are extracted as the program information of all the programs. The recording start time of the TITLE 1 is 8:30 PM. Accordingly, the control section 19 converts the recording time of "World Soccer" into the time from 0:00 to 01:30 and the recording time of "J BASEBALL" into the time from 01:30 to 02:30 with reference to 8:30 PM.

Subsequently, the program information is output to the OSD image generating section 17. The OSD image generating section 17 generates the image data so that the name of each program and the relative recording time are displayed in a program information display column 23 and outputs the image data to the monitor unit 4. The monitor unit 4 displays an image as shown in FIG. 3B (S6). That is, the title display column 22, the program information display column 23, the message display column 24 and an EPG display selection button 25 are displayed on the display screen 21b as shown in FIG. 3B. When the user operates the operation section, not shown, of the digital broadcast program recorder 1 to select a program to be reproduced, the control section 19 detects this operation (S7, S8), and the recording/reproducing section 14 reads a broadcast signal of the selected program from the recording section 15 and outputs it to the monitor unit 4 (S9, S10). According to the above operation, the user can confirm the program information before reproduction, and reproduces the desired program. The user can also easily grasp the recording time length of each program by displaying the relative time from the start of recording, as described above.

The program name of each program and the recording start time and the recording end time may be displayed without acquiring the relative time with reference to the recording start time of the TITLE 1 as described above.

If the broadcast signal of the selected program is ended (S10), the control section 19 of the digital broadcast program recorder 1 ends the reproducing process of the recording signal.

When the user, at step S8 in the flowchart of FIG. 4, selects an EPG display selection button 25 on the display screen 21b as shown in FIG. 3B, the EPG is displayed. That is, when the control section 19 detects that the EPG display selection button 25 is selected (S7, S8), the control section 19 reads the EPG information acquired at step S4 again to acquire the EPG information in a recording time zone of the TITLE 1 (S11). And the control section 19 outputs the EPG information to the OSD image generating section 17. The OSD image generating section 17 generates the image data, based on this EPG information, and outputs the image data to the monitor unit 4 (S12, S13). In this manner, the user operates the EPG display selection button 25 to display the EPG of the recorded program, and can confirm the details of the recorded program.

At step S12, the program information on channel 12-1 is only displayed, when the EPG included in the broadcast signal of the title recorded in the recording section 15 of the digital broadcast program recorder 1 involves the program broadcasting schedule for each broadcasting station.

When the user performs an operation for returning to the reproduction selection screen of the program again in the operation section (S13), the control section 19 performs the steps from S8 on.

The following advantage can be obtained by the invention.

(1) The broadcast program recorder of the invention extracts all the program names included in the file from the electronic program guide information in the file, based on the recording information recorded in the file information recording section, and outputs an image for displaying all the program names included in the file. Accordingly, the digital broadcast program recorder allows the user to confirm the name of each program on the image display device, even when a plurality of programs are recorded in series.

(2) The broadcast program recorder of the invention extracts the broadcasting start time and the broadcasting end time in addition to all the program names. Accordingly, the user can grasp the content of each program included in the file recorded with the minimum amount of information on the basis of the temporal information.

(3) The broadcast program recorder of the invention extracts the broadcasting start time and the broadcasting end time for each program, converts those times into the relative time with reference to the recording start time, and outputs an image signal displaying the relative time for each program. Accordingly, the recording time length for each program can be easily grasped on the image display device by displaying the relative time from the recording start.

(4) The broadcast program recorder of the invention extracts the electronic program guide information corresponding to the recording information from the electronic program guide information in the broadcast signal, and outputs an image signal. Accordingly, the user, who wants to know the details of program information, can easily confirm the information of each program on the image display device.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A broadcast program recorder comprising:
   a receiving section adapted to receive a broadcast signal on a selected channel from a broadcast signal transmitted along with an electronic program guide information including program information corresponding to a plurality of programs broadcasted by the broadcast signal; and
   a data recording section adapted to record and manage more than one program broadcasted by the broadcast signal of the selected channel from a recording start time to a recording end time as one file, the programs continued in terms of time;
   a file information recording section adapted to record recording information including a channel of the broadcast signal recorded in the one file, the recording start time and the recording end time, associated with the one file recorded in the data recording section;
   a control section adapted to extract all program names of the plurality of programs included in the one file from the electronic program guide information within the one file, based on the recording information recorded in the file information recording section when the one file includes the plurality of programs; and
   an image output section adapted to output an image signal to display at least a part of all the program names of the plurality of programs included in the one file when the one file includes the plurality of programs,
   wherein the control section further extracts the broadcasting start time and the broadcasting end time for each program, and extracts the electronic program guide information corresponding to the recording information from the electronic program guide information included in the broadcast signal, and converts the broadcasting start time and the broadcasting end time for each program into a relative time with reference to the recording start time, and
   wherein the image output section further outputs an image signal to display an image of the electronic program guide information extracted by the control section and the relative time for each program.

2. A broadcast program recorder comprising:
   a receiving section adapted to receive a broadcast signal on a selected channel from a broadcast signal transmitted along with an electronic program guide information including program information corresponding to a plurality of programs broadcasted by the broadcast signal;
   a data recording section adapted to record and manage more than one program broadcasted by the broadcast signal of the selected channel from a recording start time to a recording end time as one file, the programs continued in terms of time;
   a file information recording section adapted to record recording information including a channel of the broadcast signal recorded in the one file, the recording start time and the recording end time, associated with the one file recorded in the data recording section;
   a control section adapted to extract all the program names of the plurality of programs included in the one file from the electronic program guide information within the one file, based on the recording information recorded in the file information recording section when the one file includes the plurality of programs; and
   an image output section adapted to output an image signal to display at least a part of all the program names of the plurality of programs included in the one file when the one file includes the plurality of programs.

3. The broadcast program recorder as claimed in claim 2, wherein the control section extracts all the program names of the plurality of programs from the electronic program guide information included in the broadcast signal.

4. The broadcast program recorder as claimed in claim 2, wherein the one file managed by the data recording section comprises broadcast signal data, which are associated with the plurality of programs broadcasted successively with one another from a same broadcasting channel.

5. The broadcast program recorder as claimed in claim 2,
   wherein the control section further extracts the broadcasting start time and the broadcasting end time for each program, wherein the control section further converts the broadcasting start time and the broadcasting end time for each program into a relative time with reference to the recording start time, and wherein the image output section further outputs an image signal to display the relative time for each program.

6. The broadcast program recorder as claimed in claim 2, further comprising a reproducing section adapted to read the broad cast signal recorded in the data recording section and output the read broadcast signal, wherein when a user selects one program name from the displayed program names of the plurality of programs included in the one file, the reproducing section reads the broadcast signal associated with the selected one program name and outputs the read broadcast signal.

* * * * *